(12) United States Patent
Leimann

(10) Patent No.: US 7,220,359 B2
(45) Date of Patent: May 22, 2007

(54) LUBRICATION SYSTEM

(75) Inventor: Dirk-Olaf Leimann, Antwerp (BE)

(73) Assignee: Hansen Transmissions International, Antwerp (BE)

( * ) Notice: Subject to any disclaimer, the term of this patent is extended or adjusted under 35 U.S.C. 154(b) by 316 days.

(21) Appl. No.: 10/471,417

(22) PCT Filed: Mar. 12, 2002

(86) PCT No.: PCT/IB02/01810

§ 371 (c)(1),
(2), (4) Date: Mar. 10, 2004

(87) PCT Pub. No.: WO02/086378

PCT Pub. Date: Oct. 31, 2002

(65) Prior Publication Data

US 2004/0134859 A1    Jul. 15, 2004

(30) Foreign Application Priority Data

Mar. 12, 2001  (GB)  ................................ 0106003.7

(51) Int. Cl.
*B01D 35/06* (2006.01)

(52) U.S. Cl. .................. 210/695; 384/492; 210/222; 210/223; 210/695; 184/6.25

(58) Field of Classification Search .............. 384/492; 210/222, 223, 695; 184/6.25

See application file for complete search history.

(56) References Cited

U.S. PATENT DOCUMENTS

| | | |
|---|---|---|
| 3,151,703 A | 10/1964 | Benk |
| 3,800,914 A | 4/1974 | Miyata |
| 4,834,464 A | 5/1989 | Frehse |
| 5,205,617 A | 4/1993 | Hoffmann |
| 5,811,000 A | 9/1998 | Franz et al. |
| 6,039,550 A | 3/2000 | Friedley et al. |
| 6,318,898 B1 * | 11/2001 | Ward et al. ............... 384/492 |

FOREIGN PATENT DOCUMENTS

GB    1 559 369    1/1980

* cited by examiner

*Primary Examiner*—David A. Reifsnyder
(74) *Attorney, Agent, or Firm*—Young & Thompson

(57) ABSTRACT

A method for reducing the presence of ferritic particles in lubricant employed in the lubrication of rotary shaft bearing of the type that include a first bearing contact surface, a second bearing contact surface and a plurality of rotatable bearing members disposed therebetween, a lubrication system employing such method and a lubricated assembly. The method includes providing a ferritic particle collector element of magnetised material in close proximity to the bearing and a path of lubricant flowing to the bearing. The close proximity being within a distance from the bearing contact surface which is less than five times the maximum diameter of the bearing contact surfaces. The collecting element may be an existing component of a lubrication system or lubricated assembly which is rendered magnetic or may be a magnet or magnets secured to an existing component.

17 Claims, 4 Drawing Sheets

Section A-A

LUBRICATION SYSTEM

BACKGROUND OF THE INVENTION

This invention relates to a lubrication system and in particular, although not exclusively, to a lubrication system for a gear unit, and a gear unit comprising a lubrication system, wherein said gear unit comprises a plurality of rotatable components rotatably supported by rotary shaft bearings such as ball bearings or roller bearings.

In a gear unit, as well as other types of lubricated equipment, the cleanliness of the oil is one of the most important factors influencing the life time of the bearings. In a method of bearing calculation according to ISO 281 standard, and in combination with a service life factor ($a_{xyz}$) dependent on load and contamination, the factor for the contamination varies from 0 to 1. For dip or splash lubricated gear units, the factor can never become 1 because there is no possibility of effective filtration. In the case of force lubricated gear units using a filter to improve cleanliness and reduce the contamination, significant expense is involved because micro filters must be used to get a good contamination factor approaching 1.

In contaminated oil it is primarily only hard particles that decrease the working life of the bearing. Normally those particles are of steel and arise from wear occurring during use. It is known to employ oil sump drain plugs of the kind incorporating a magnet to collect such particles, but generally these are of only poor effectiveness because the magnet is of only small size.

SUMMARY OF THE INVENTION

The present invention seeks to provide a lubrication system and a lubricated assembly comprising a lubrication system in which potentially damaging contaminant particles are more effectively and efficiently removed than hitherto. It seeks also to provide lubricated equipment, such as gear unit, having an enhanced working life.

In accordance with aspects of the present invention there is provided a lubricated assembly a lubrication system and a method for reducing the presence of ferritic particles in a lubricant employed for the lubrication of a rotary shaft bearing of the type comprising a first bearing contact surface, a second bearing contact surface and a plurality of rotatable bearing members disposed therebetween, wherein a collector element of magnetized material is provided in close proximity to the bearing and the path of lubricant flowing to the bearing, said collector element being provided at a distance from said bearing contact surfaces which is less than 5 times the maximum diameter of said bearing contact surfaces.

Preferably the distance of the collector element from said bearing contact surfaces is less than 3 times the maximum diameter of said bearing contact surfaces.

The bearing may be primarily a radial type bearing, in which case said maximum diameter will be defined by the maximum contact surface diameter of the outer bearing ring or cup. The bearing may be primarily an axial type bearing, in which case both of the first and second contact surfaces will define a substantially common maximum diameter, or it may be of a type with transmits both axial and radial loads, in which case one of the two contact surfaces will define said maximum diameter.

The bearing members may for example be in the shape of a ball, or a roller such as of a cylindrical or frusto-conical shape.

The present invention further teaches that in lubricated equipment comprising a plurality of rotary shaft bearings, at least two of the rotary shaft bearings are in said proximity to a collector element. If the two bearings are sufficiently close to one another they may be in close proximity to a common collector element Alternatively, and also in the case of bearings more widely spaced, each have said two bearings may have a respective collector element associated therewith.

In the case of equipment having dip or bath type lubrication it is preferred that the collector element is spaced from the bearing contact surfaces by a distance less than the maximum diameter of said bearing contact surfaces, more preferably less than half of that distance.

In the case of equipment having splash lubrication, preferably splashed oil or like lubricant is guided to the bearing via a lubricant collector and channel system. In that case the collector element of magnetic material may be provided as part of the lubrication collection system and channel, and preferably at a distance from the bearing element less than 3 times the maximum diameter of said bearing contact surfaces.

The structure of the collector element may be comprised by a conventionally provided component of a gear unit, such as a bearing cover cap or seal but which, in accordance with the present invention is rendered magnetic either by being formed of material which is, or is caused to become, magnetic, or to which a magnet is secured.

Thus, in the case of a rotary shaft bearing supported by the outer housing wall of a lubricated assembly such a gear unit, and wherein the housing wall is provided with a selectively moveable bearing cap, said bearing cap may comprise the collector element of magnetised material. A metal component of or serving as the bearing cap may be of magnetised material, or a permanent magnet may be secured to the bearing cap. An outer surface of a bearing cap may be provided with a coating of polymeric material, such rubber, so as to prevent the outer surface of the housing undesirably collecting ferritic particles.

In the case of a lubricated assembly which employs splash lubrication and is provided with a lubricant collecting box in which splashed lubricant is collected for feeding to a bearing, the collecting box may be comprised of magnetised material or have a permanent magnet secured thereto. Preferably an outer surface of the box exposed to the splash flow is provided with a polymer coating thereby to enhance the degree to which ferritic particles are arrested within the lubricant collecting box and thus are less exposed to displacement during extreme operating conditions such as when the flow of splash lubricant is temporarily at a higher than normal velocity.

In the case of lubricated equipment which is a multi-stage gear unit it is preferred that a collector element of magnetised material is provided in said close proximity to each of the bearings of a low speed shaft, and preferably also in close proximity to at least an adjacent intermediate shaft.

BRIEF DESCRIPTION OF THE DRAWINGS

Embodiments of the present invention will now be described, by way of example only, with reference to the accompanying diagrammatic drawings in which.

DETAILED DESCRIPTION OF THE PREFERRED EMBODIMENTS

Figure 1:
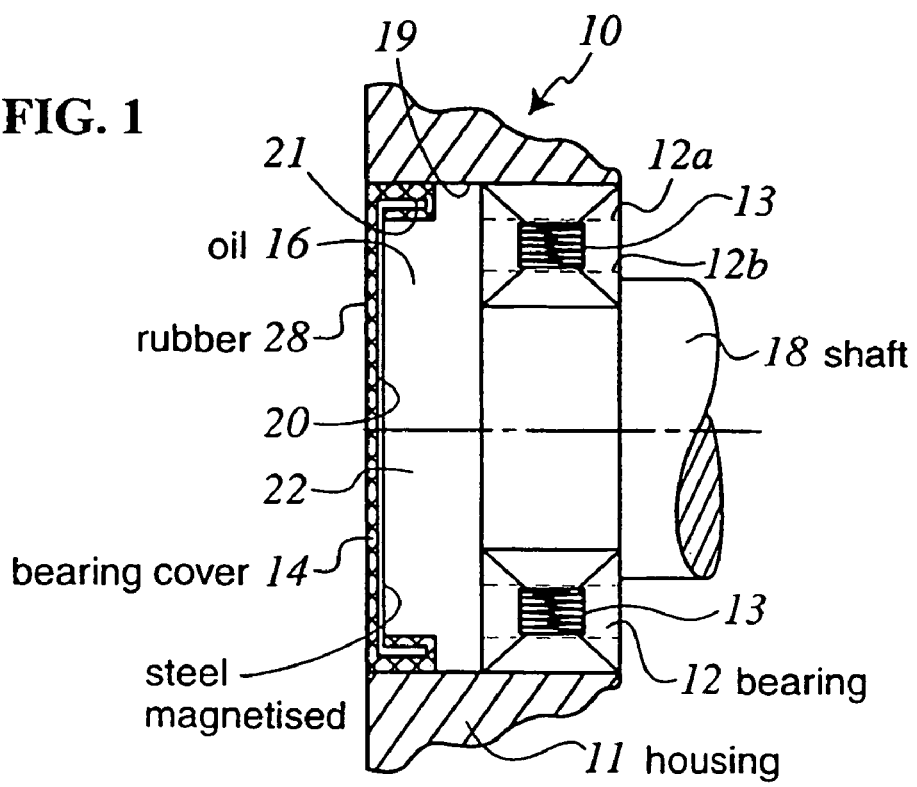
FIG. 1 is a cross-sectional view of part of a gear unit having a lubrication system in accordance with the present invention.

FIG. 1 shows part of a gear unit 10 having a housing outer wall 11 which supports a bearing 12 in which a shaft 18 is rotatably mounted. The bearing 12 is a roller bearing comprising rollers 13 which maintain spaced apart relatively rotatable inner and outer bearing contact surfaces 12B, 12A.

The bearing 12 is located in a through-bore 19 in the housing wall whereby if necessary the bearing can be fitted or removed from externally of the gear unit. A bearing cover cap 14 fits tightly in the through-bore 19 and seals against leakage of the oil lubricant 16.

The bearing cover cap 14 is of a laminated construction comprising a magnetised steel cap having a central disc portion 20 and an axially inwardly extending flanged edge 21. The outer surface of the disk portion is provided with a rubber coating 28 which also extends over and encapsulates the flanged edge 21. Said rubber material assists in providing a fluid seal between the flanged edge of the cap and the through-bore 19, as well as resisting unwanted collection of ferritic particles on the external surface of the bearing cover cap 14.

In use of the gear unit, oil 16 tends inherently to flow axially through the bearing 12 in a direction from the chamber 22 defined by the space between the end of the shaft 18 and the bearing cover cap 14. In this embodiment the axial space between the bearing cover cap 14 and the bearing 12 at the end of the shaft 18 is approximately one third of the diameter of the bearing outer contact surface 12A. Thus the magnetised steel of the bearing cover plate is in close proximity to the bearing at a position in the direction of flow of oil to the bearing, and it is thereby found possible to effectively arrest ferritic particles from flowing into the bearing and causing damage to the bearing rollers 13 or the bearing contact surfaces 12A, 12B.

Figure 2:
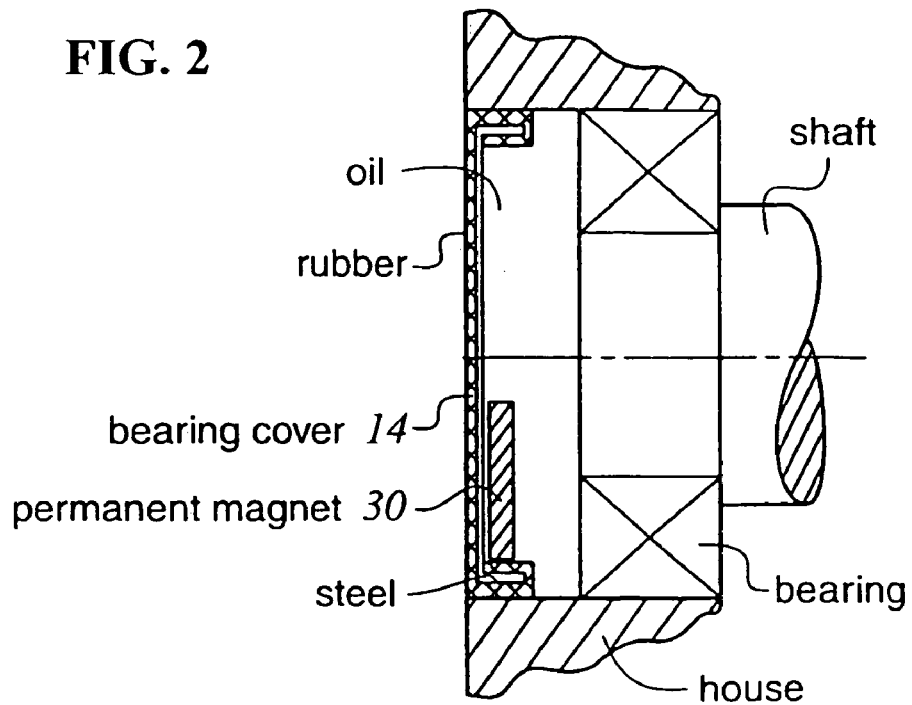
FIG. 2 is a cross-sectional view of part of another gear unit having a lubrication system in accordance with the present invention.

FIG. 2 shows a modification of the embodiment of FIG. 1 in which the need to magnetise the steel of the bearing cover cap 14 is avoided by the use instead of a permanent magnet 30 secured to the bearing cover cap 14. In this construction it is not necessary that the bearing cover cap comprise a steel insert, and it may alternatively comprise a reinforcing insert of non magnetisable material.

Figure 3:
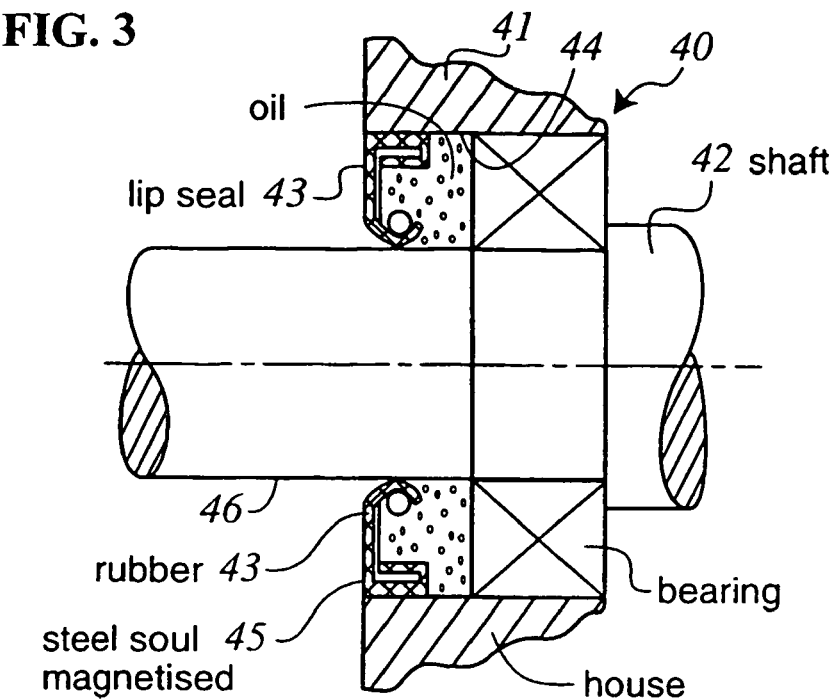
FIG. 3 is a cross-sectional view of part of a further gear unit having a lubrication system in accordance with the present invention.

FIG. 3 show a further variation of the invention as applied to a bearing 40 mounted in a gear unit housing outer wall 41 for support of a shaft 42 that extends through the housing wall. In this construction an annular lip seal 43 is located within the bore 44 of the housing wall and provides a fluid seal against the outer surface 46 of the shaft 42. The lip seal comprises an annular reinforcing element 45 which may be of steel and magnetised so as to perform a particle collection function in the same manner as the magnetised steel of the end cap described with reference to FIG. 1. Alternatively a permanent magnet may be secured to the lip seal, irrespective of whether the lip seal is reinforced by an element of magnetisable or non magnetisable material, such that the permanent magnet can serve to collect ferritic particles in the same manner as described above with reference to FIG. 2.

Figure 4:
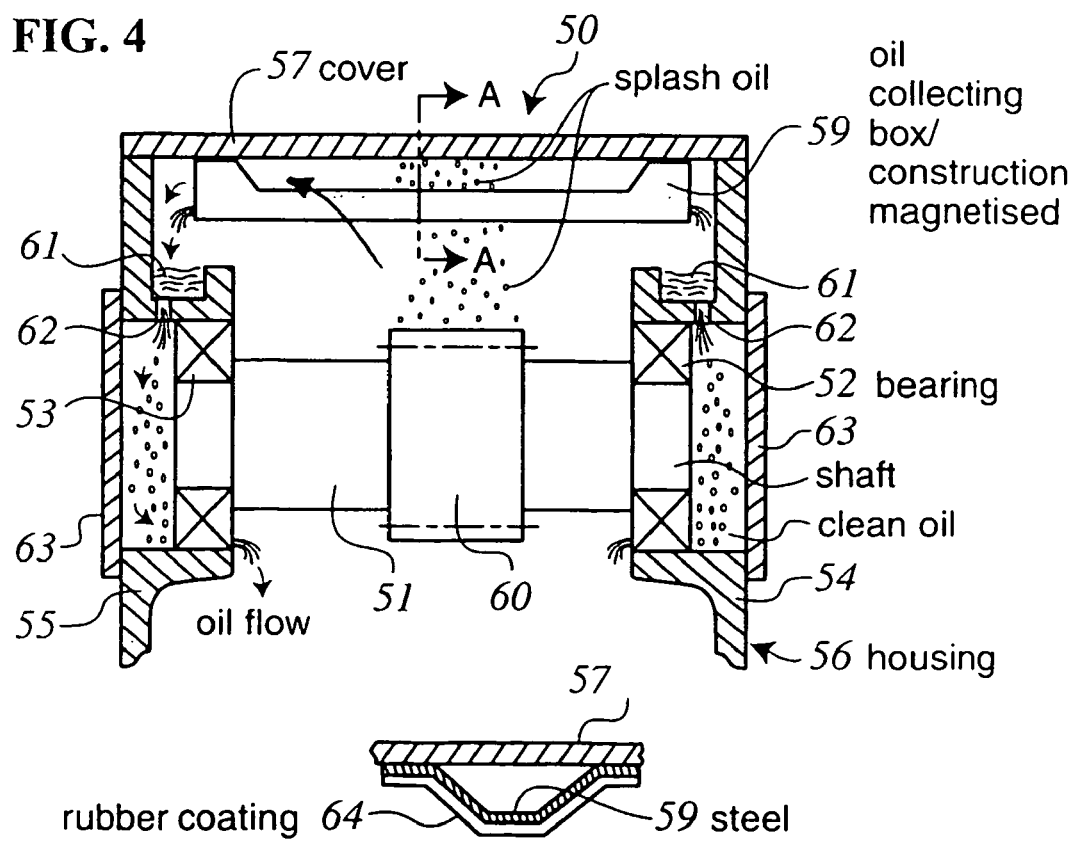
FIG. 4 is a cross-sectional view of part of a gear unit employing a splash lubrication system in accordance with the present invention.

In FIG. 4 there is shown part of the multi stage gear unit 50 comprising a low speed shaft 51 rotatably supported by taper roller bearings 52, 53 mounted in respective spaced side walls 54, 55 of the gear unit housing 56. The housing comprises a cover plate 57 which supports, within the lubricated chamber of the gear unit housing, an oil collecting box 59. The oil collecting box 59 is positioned in a manner known per se to collect oil splashed upwards from a pinion 60 mounted on the shaft, and is arranged to direct the flow of collected oil sideways and downwards to collection zones 61 from which oil feeds through respective apertures 62 into the space between an end of the shaft 51 and outer bearing cover 63. In this embodiment the oil collecting box is formed from pressed steel which has been magnetised, and the surface of the steel facing towards the pinion wheel is provided with a rubber coating 64 whereby ferritic partlicles contained within splashed oil tend inherently to accumulate within the oil collecting box.

Figure 5:
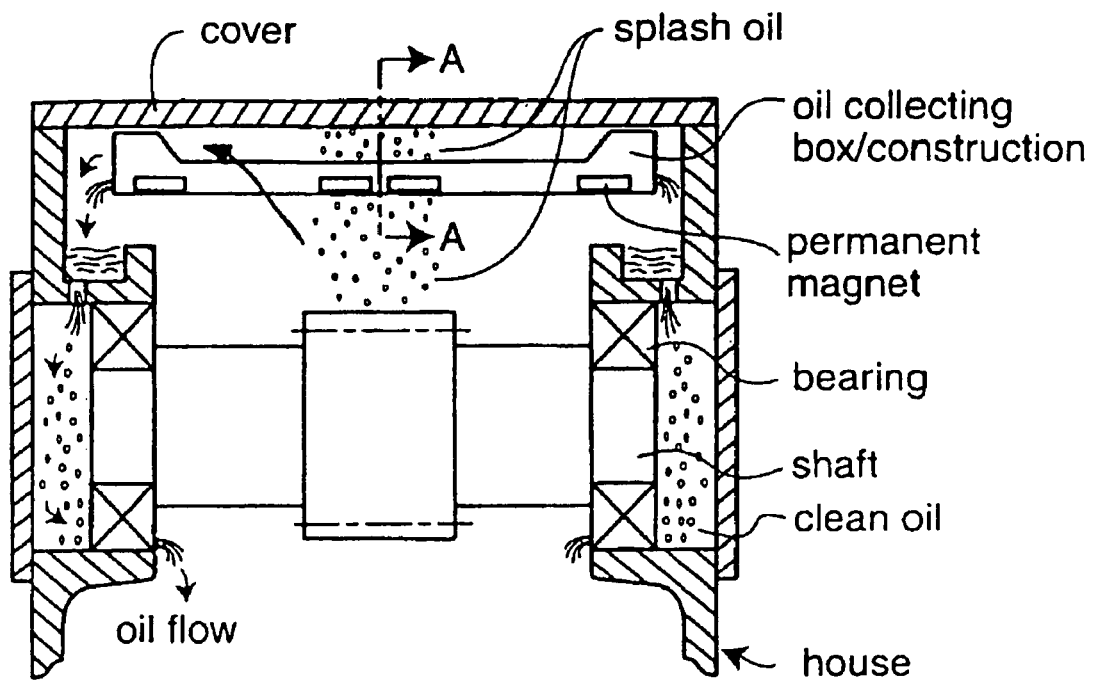
FIG. 5 is a cross-section of part of yet another gear unit which employs a splash lubrication system in accordance with the present invention.
Figure 5:
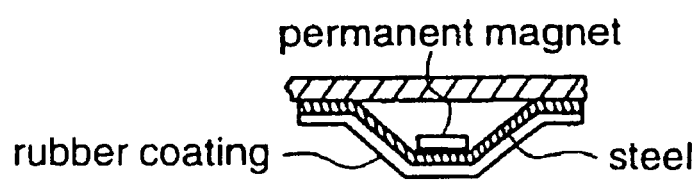

FIG. 5 shows a variation of the embodiment of FIG. 4 in which the oil collecting box is formed either of non magnetised material or non magnetisable material. Contained within the box 60 is a permanent magnet 61 for collection of ferritic particles. As in respect of the FIG. 4 embodiment, a surface of the collecting box facing towards the pinion wheel may be provided with a rubber or like coating to resist collection of ferritic particles at that surface of the collecting box.

Figure 6:
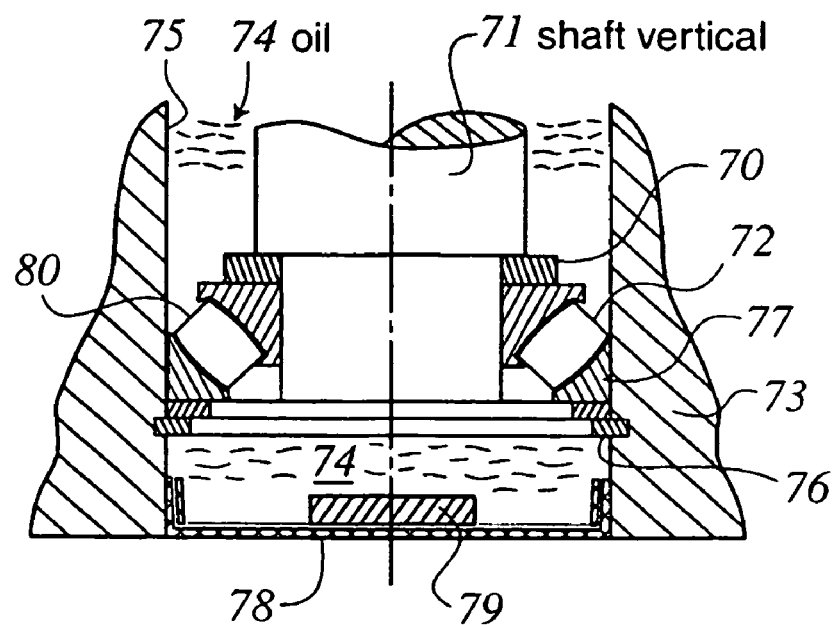
FIG. 6 is a cross-sectional view of part of a gear unit showing the lower end region of a vertically mounted shaft.

FIG. 6 shows the lower end region 70 of a vertically mounted shaft 71 supported by a bearing 72 which primarily provides axial location of the shaft 71 relative to the gear unit housing 73. The shaft end and bearing, in use, are immersed in sump oil 74. Radial location of the shaft 71 is provided by a pair of axially spaced ball bearings (not shown), one of which may be positioned in the oil sump and the other of which may be located above the sump and, for example, be of a sealed type pre-filled with a grease lubricant. The bearing 72 is located in a bore 75 of the housing wall which also locates an annular abutment ring 76 for the outer bearing cup 77. The bore 75 is sealed by a rubber covered end cap 78 to the inner surface of which is secured a permanent magnet 79. In this embodiment the spacing of the magnet 79 from the bearing 72 is less that the maximum outer diameter of the bearing contact surface 80 of the bearing cup 77.

Figure 7:
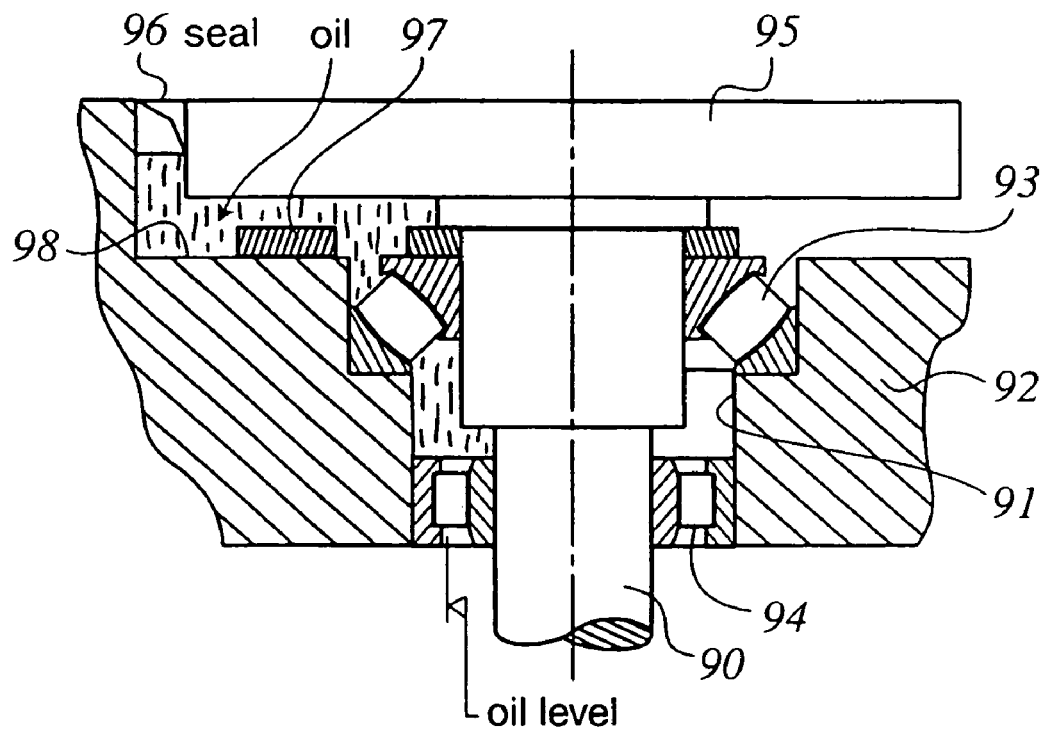
FIG. 7 is a cross-sectional view of part of a gear unit having a shaft end supported by two bearings.

FIG. 7 shows a horizontally mounted shaft 90 rotatably supported relative to a bore 91 in a gear unit housing 92 by means of an axial load bearing 93 and a radial load bearing 94. A cap 95 and seal 96 close the bore 91 against leakage of oil. In this embodiment a permanent magnet 97 is secured to a surface 98 of the housing wall in close proximity to the axial load bearing 93.

As compared with the conventional procedure of providing an oil drain plug with a magnet, or magnetisable material, and which is remote from many of the lubricated surfaces in a lubricated assembly, the present invention achieves a very much enhanced ability to arrest flow of ferritic particles before damage occurs. In consequence it is possible to achieve a substantially improved load and contamination factor for use in calculating bearing life according to ISO 281. Servicing and replacement part costs are thereby reduced, and this is achieved without the need to employ expensive micro filters. The additional expenditure required by the present invention is confined to either magnetising of material already employed in a lubricated assembly such as gear unit or providing permanent magnets, and optionally rubber coatings to selectively resist accumulation of ferritic particles at selected surface regions.

The invention claimed is:

1. A method for reducing the presence of ferritic particles in a lubricant employed for the lubrication of a gear unit comprising a plurality of rotary shaft bearings of the type comprising a first bearing contact surface, a second bearing contact surface and a plurality of rotatable bearing members disposed therebetween, said method comprising:

placing a ferritic particle collector element of magnetized material adjacent to each of at least two of said plurality of rotary shaft bearings and a path of lubricant flowing to said plurality of rotary shaft bearings; and spacing each of said at least two of said plurality of rotary shaft bearings at a distance from a respective collector element so that corresponding first and second bearing contact surfaces are less than five times the maximum diameter of said first and second bearing contact surfaces.

2. The method according to claim 1, wherein said step of spacing said at least two of said plurality of rotary shaft bearings comprises spacing the respective collector element from said corresponding first and second bearing contact surfaces less than three times the maximum diameter of said first and second bearing contact surfaces.

3. The method according to claim 1, wherein the step of spacing said at least two of said plurality of rotary shaft bearings comprises spacing the respective collector element from the corresponding first and second bearing contact surfaces by a distance of less than the maximum diameter of said first and second bearing contact surfaces.

4. The method according to claim 1, wherein the step of spacing said at least two of said plurality of rotary shaft bearings comprises spacing the respective collector element from the corresponding first and second bearing contact surfaces by a distance of less than half of the maximum diameter of said first and second bearing contact surfaces.

5. A gear unit lubrication system for reducing the presence of ferritic particles in a lubricant employed for the lubrication of a gear unit comprising:

plural rotary shaft bearings comprising a first bearing contact surface, a second bearing contact surface and a plurality of rotatable bearing members disposed therebetween; and a ferritic particle collector element of magnetized material provided adjacent to each of at least two of the plural rotary shaft bearings and a path of lubricant flowing to the plural rotary shaft bearings, wherein a distance from a respective collector element to corresponding first and second bearing contact surfaces of each of said at least two of the plural rotary shaft bearings is less than five times the maximum diameter of said first and second bearing contact surfaces.

6. The lubrication system according to claim 5, wherein said distance is less than three times the maximum diameter of said first and second bearing contact surfaces.

7. The lubrication system according to claim 5 wherein the collector element is rendered magnetic either by being formed of a magnetic material or a material which is caused to become magnetic.

8. The lubrication system according to claim 6 wherein the collector element further comprises a magnet secured thereto.

9. The lubrication system according to claim 5 wherein selected parts of the lubrication system are provided with a coating of a polymeric material to prevent those parts undesirably collecting ferritic particles.

10. The gear lubrication system according to claim 5, wherein the distance from the respective collector element to the corresponding first and second bearing contact surfaces is less than the maximum diameter of said first and second bearing contact surfaces.

11. The gear lubrication system according to claim 5, wherein the distance from the respective collector element to the corresponding first and second contact bearing surfaces is less than half of the maximum diameter of said first and second bearing contact surfaces.

12. The gear lubrication system according to claim 5, wherein said at least two of said plurality of rotary shaft bearings are each associated with a respective separate collector element.

13. The gear lubrication system according to claim 5, wherein said at least two of said plurality of rotary shaft bearings are each associated with a common collector element.

14. The gear lubrication system according to claim 5, wherein the collector unit is formed by or is contained within an oil collecting box of the gear unit.

15. The gear lubrication system according to claim 5, wherein the collector element comprises a selectively moveable bearing cap provided in an outer housing wall of the gear unit.

16. The gear lubrication system according to claim 5, wherein the collector element is formed by or is contained within a seal.

17. A lubricated gear unit assembly comprising a gear unit lubrication system according to claim 5.

* * * * *